(12) United States Patent
Kawamura et al.

(10) Patent No.: US 7,670,057 B2
(45) Date of Patent: Mar. 2, 2010

(54) VEHICLE WHEEL BEARING APPARATUS

(75) Inventors: Hiroshi Kawamura, Iwata (JP); Kiyotake Shibata, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/204,904

(22) Filed: Sep. 5, 2008

(65) Prior Publication Data
US 2009/0046970 A1 Feb. 19, 2009

Related U.S. Application Data

(63) Continuation of application No. PCT/JP2007/000158, filed on Mar. 1, 2007.

(30) Foreign Application Priority Data
Mar. 6, 2006 (JP) .............................. 2006-059709

(51) Int. Cl.
*F16C 19/08* (2006.01)

(52) U.S. Cl. ...................... 384/544; 384/589

(58) Field of Classification Search ................ 384/537, 384/544, 589; 301/105.1; 29/894.362, 898.07
See application file for complete search history.

(56) References Cited

U.S. PATENT DOCUMENTS

| 5,021,918 | A  | * | 6/1991 | Maki ........................... 361/216 |
| 6,415,508 | B1 | * | 7/2002 | Laps ..................... 29/894.362 |
| 6,626,580 | B2 | * | 9/2003 | Tajima et al. ................ 384/544 |
| 6,702,398 | B2 | * | 3/2004 | Laps ........................ 301/105.1 |
| 2001/0012419 | A1 | * | 8/2001 | Tajima et al. ................ 384/544 |
| 2003/0098609 | A1 | * | 5/2003 | Nakamura et al. ........ 301/105.1 |
| 2005/0115072 | A1 | * | 6/2005 | Kaneko .................... 29/898.07 |
| 2005/0141799 | A1 | * | 6/2005 | Uyama et al. ................ 384/544 |
| 2007/0201783 | A1 | * | 8/2007 | Hirai et al. ................... 384/544 |

FOREIGN PATENT DOCUMENTS

| JP | 2001-328401 | 11/2001 |
| JP | 2003-211907 | 7/2003 |
| JP | 2004-076753 | 3/2004 |
| WO | WO 2005/088147 | 9/2005 |
| WO | WO 2005/116471 | 12/2005 |

* cited by examiner

*Primary Examiner*—Marcus Charles
(74) *Attorney, Agent, or Firm*—Harness, Dickey & Pierce, P.L.C.

(57) ABSTRACT

A vehicle wheel bearing apparatus for a driven wheel has an outer member integrally formed with a body mounting flange on its outer circumference. The body mounting flange is adapted to be mounted on a knuckle forming part of a suspension apparatus of the vehicle. The outer member inner circumference includes double row outer raceway surfaces. An inner member includes a wheel hub and at least one inner ring. The inner member has a plurality of inner raceway. Double row rolling elements are freely rollably contained, via cages, between the outer raceway surfaces and inner raceway surfaces. The knuckle is integrally formed with a disc-shaped bottom. The outer member is adapted to be connected to the knuckle, via bolts, with the body mounting flange abutted against the knuckle. The inner side end of the inner member is covered by the knuckle.

6 Claims, 4 Drawing Sheets

[Fig 1]
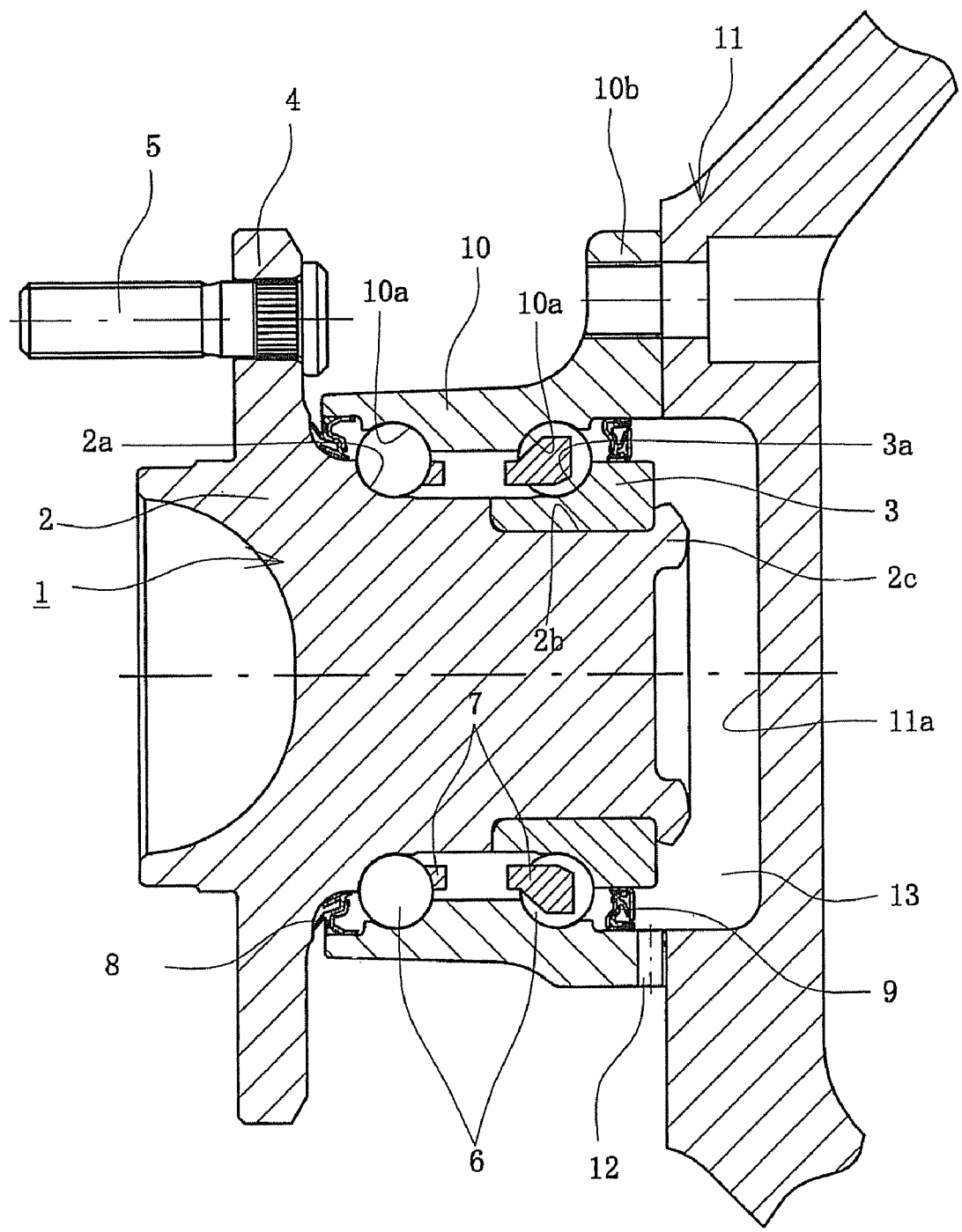

[Fig 2]
(a)
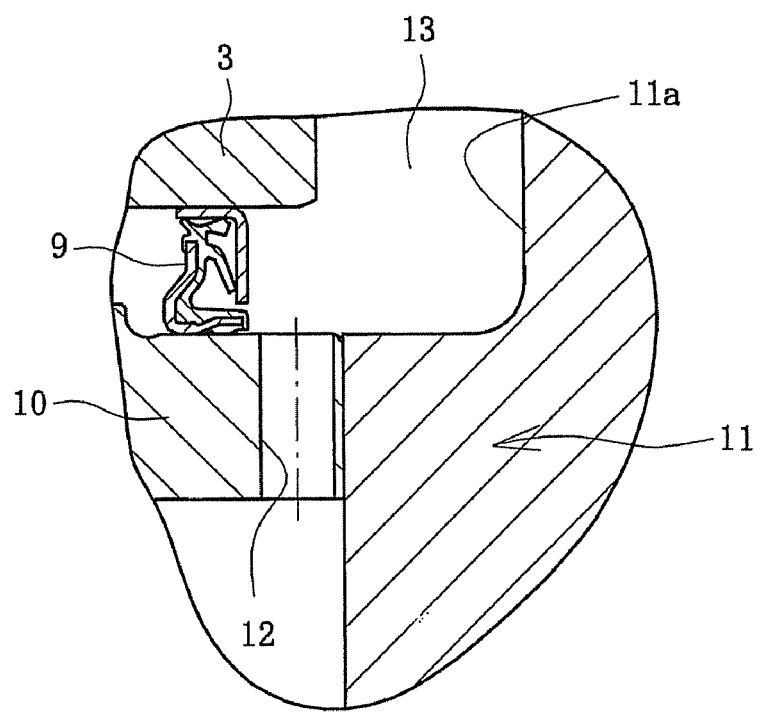
(b)
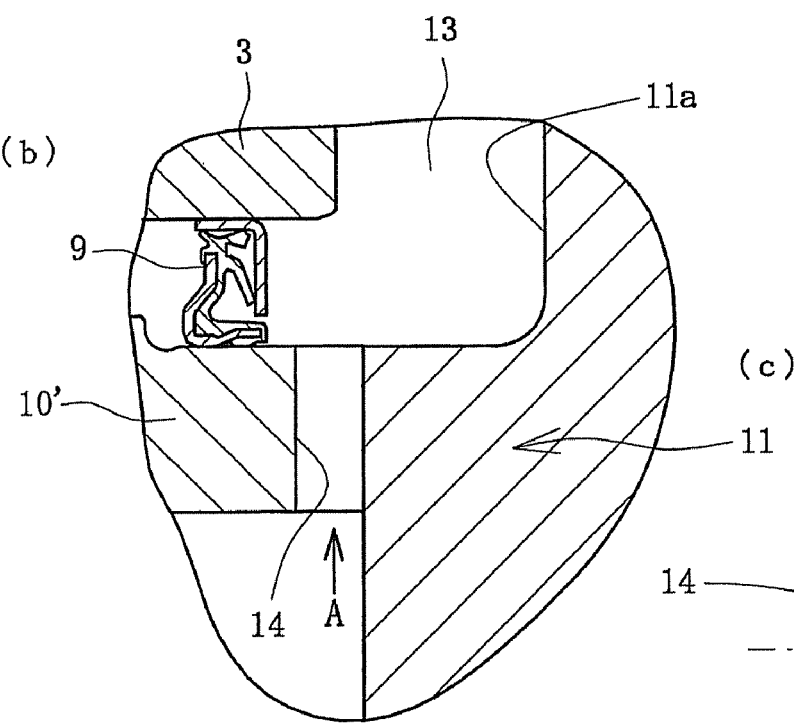
(c)
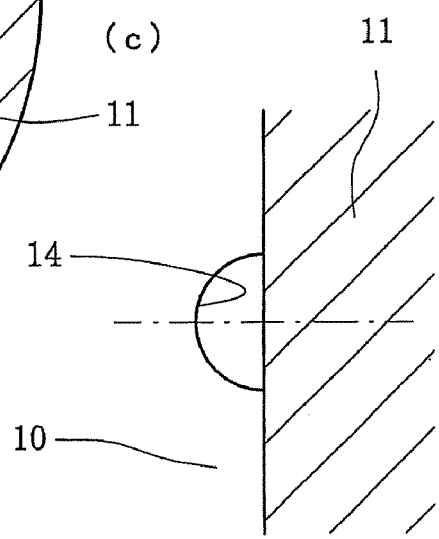

[Fig 3]
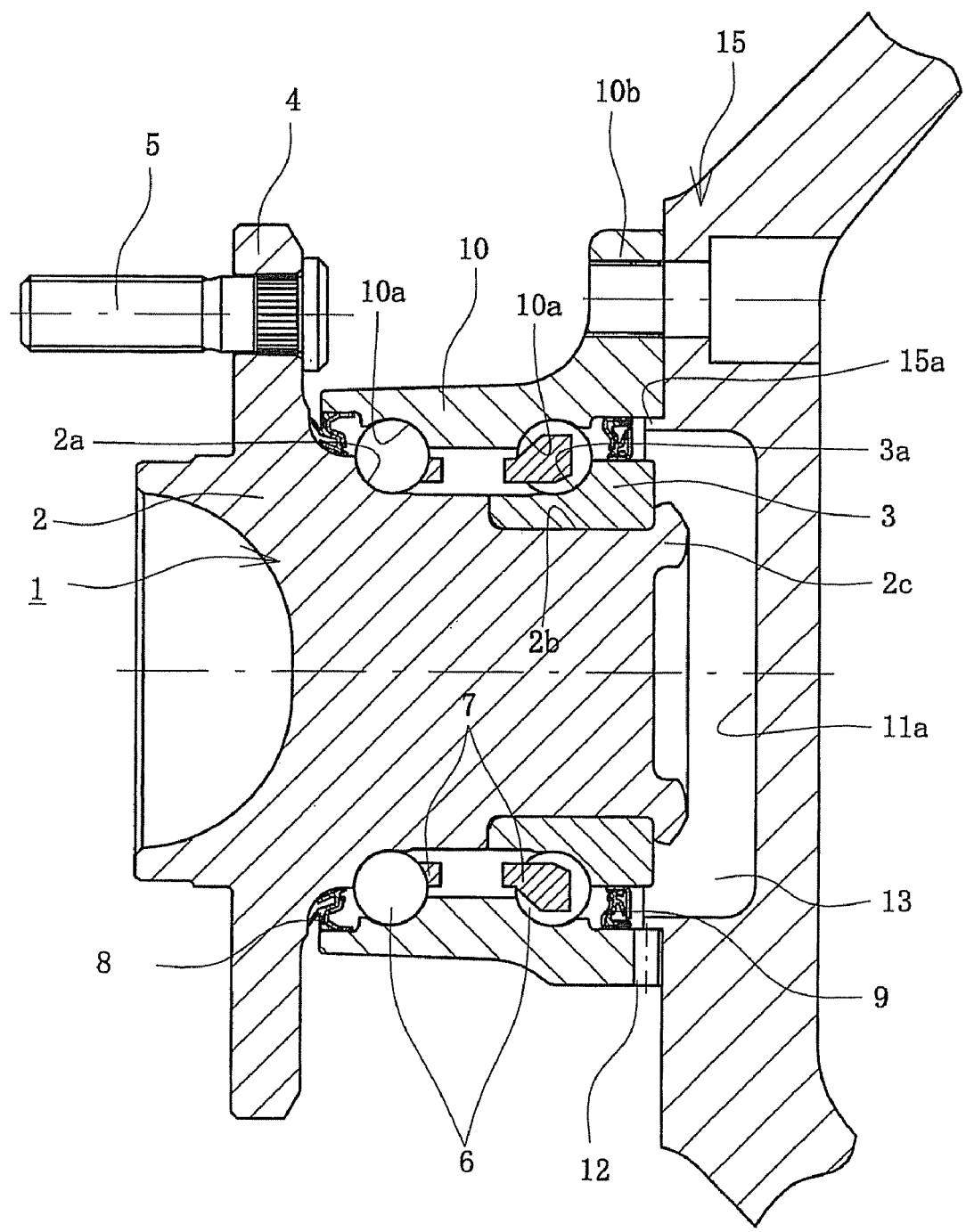

[Fig 4]
PRIOR ART
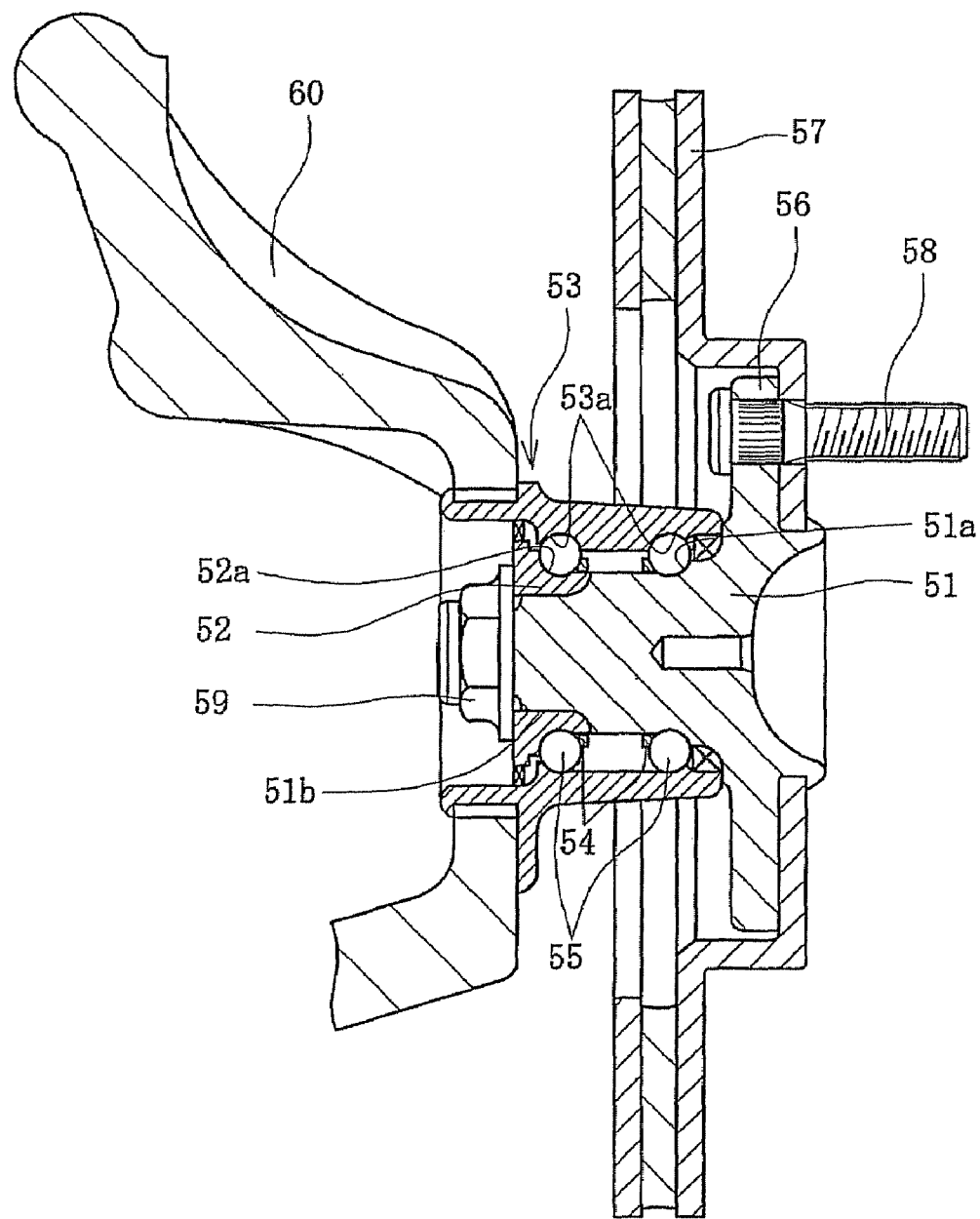

VEHICLE WHEEL BEARING APPARATUS

CROSS-REFERENCE TO RELATED APPLICATIONS

This application is a continuation of International Application No. PCT/JP2007/000158, filed Mar. 1, 2007, which claims priority to Japanese Application No. 2006-059709, filed Mar. 6, 2006. The disclosures of the above applications are incorporated herein by reference.

FIELD

The present disclosure relates to a bearing apparatus to support a wheel of a vehicle, such as an automobile, relative to a suspension apparatus and more particularly, to a bearing apparatus for a driven wheel of the vehicle that reduces the weight and size as well as increases the rigidity and strength of a knuckle connected to the bearing apparatus.

BACKGROUND

In general there are two types of the vehicle wheel bearing apparatus. Those for a driving wheel and those for a driven wheel. In either type of wheel bearing apparatus, there is a desire to reduce manufacturing costs, weight and size in order to improve fuel consumption. A well known representative of a prior art wheel bearing apparatus for a driven wheel is shown in FIG. 4.

The wheel bearing apparatus of FIG. 4 is a so called "third generation type". It includes an inner member with wheel hub 51, an inner ring 52, an outer member 53, and double row balls 55, 55 contained between the inner member 51, 52 and the outer member 53, via cages 54. The wheel hub 51 is integrally formed at one end with a wheel mounting flange 56. The flange 56 mounts a wheel (not shown). The outer circumference on the wheel hub includes an inner raceway surface 51a and has a cylindrical portion 51b that axially extends from the inner raceway surface 51a. In addition, the hub bolts 58 secure both a wheel and a brake rotor 57. The bolts 58 are arranged equidistantly along the periphery of the wheel mounting flange 56.

The inner ring 52 is formed with another inner raceway surface 52a on its outer circumference. The inner ring 52 is press-fit onto the cylindrical portion 51b of the wheel hub 51. The inner ring 52 is prevented from axially slipping off of the wheel hub 51 by a securing nut 59. The nut 59 is adapted to be fastened to a male thread formed on the end of the cylindrical portion 51b.

Double row outer raceway surfaces 53a, 53a are formed on the inner circumference of the outer member 53. The double row balls 55, 55 are freely rollably contained between the double row outer raceway surfaces 53a, 53a and the oppositely arranged double row inner raceway surfaces 51a, 52a.

A knuckle 60, forming part of a suspension apparatus, is fit onto the outer circumference of the outer member 53, via a serration. A caulked portion firmly secures the knuckle onto the outer member 53. Similarly, the brake rotor 57 is firmly secured to the wheel hub 51 by caulking the end of the wheel hub 51. Such a fixation, via caulking, reduces the number of parts and thus the weight of the bearing apparatus while simplifying its assembling process (e.g. see Japanese Laid-open Patent Publication No. 328401/2001).

SUMMARY

In the prior art vehicle wheel bearing apparatus, it is possible to reduce the number of parts by replacing the nut for securing the knuckle 60 to the outer member 53 with a caulking portion and to simplify its assembling process. The knuckle 60 is required to keep a space for the serration fitting. In addition, the central recessed portion of the knuckle 60 is vacant and it has no structural support. Thus, it is difficult to improve the strength and the bending rigidity of the knuckle 60. This also results in disturbing the reduction of the weight and size of the bearing apparatus.

It is therefore an object of the present disclosure to provide a bearing apparatus for a driven wheel of a vehicle that increases the rigidity and strength of the knuckle and reduces the weight and size of the wheel bearing apparatus.

Accordingly, a vehicle wheel bearing apparatus for a driven wheel comprises an outer member integrally formed with a mounting flange on its outer circumference. The body mounting flange is adapted to be mounted on a knuckle forming part of a suspension apparatus of the vehicle. The outer member is formed with double row outer raceway surfaces on its inner circumference. An inner member includes a wheel hub and at least one inner ring. The wheel hub has a wheel mounting flange formed at one end portion. A cylindrical portion axially extends from the wheel mounting flange. The inner ring is press fit onto the cylindrical portion of the wheel hub. The inner member has a plurality of inner raceway surfaces adapted to be arranged opposite to the plurality of outer raceway surfaces. Double row rolling elements are freely rollably contained, via cages, between the outer raceway surfaces and inner raceway surfaces, respectively, of the outer member and the inner member. Seals are arranged in annular spaces formed between the outer member and the inner member. The knuckle is integrally formed with a disc-shaped bottom. The outer member is adapted to be connected to the knuckle, via bolts, with the body mounting flange abutted against the knuckle. The inner side end of the inner member is covered by the knuckle.

In such a vehicle wheel bearing apparatus for a driven wheel of the inner ring rotation type, the knuckle is integrally formed with a disc-shaped bottom. The outer member is adapted to be connected to the knuckle, via bolts, with the body mounting flange abutted against the knuckle. The inner side end of the inner member is covered by the knuckle. Thus, it is possible to eliminate the pilot portion of the outer member to be fit into the knuckle. Thus, this increases the rigidity and strength of the knuckle while reducing the weight and size of the wheel bearing apparatus.

A draining aperture is formed at a bottom region facing toward the ground in a connected portion between the outer member and the knuckle. A closed space formed by the outer member and the knuckle is communicated with the external circumstance. This makes it possible to prevent the penetration of foreign matter, such as rain water or dusts, into the closed space through the draining aperture. Also this makes it possible to easily discharge the foreign matter through the draining aperture. Thus, this prevents the foreign matter from penetrating into the inside of the bearing apparatus even if the foreign matter would penetrate into the closed space through the connected portion between the outer member and the knuckle.

The draining aperture is formed at the inner side end of the outer member. The draining aperture is formed by a radially extending groove formed on one of the outer member and the knuckle and by an abutting surface of the other member of the outer member and the knuckle.

The knuckle is formed with a spigot portion adapted to be fit into an inner circumference of the inner side end of the outer member. This positions the knuckle relative to the outer member. This makes it possible to easily position the outer member in a radial direction relative to the knuckle. Thus, this improves the workability during assembly.

The wheel bearing apparatus of the present disclosure includes an outer member integrally formed with a body mounting flange on its outer circumference. The body mounting flange is adapted to be mounted on a knuckle, forming part of a suspension apparatus of the vehicle. The outer member on its inner circumference is formed with double row outer raceway surfaces. An inner member includes a wheel hub and at least one inner ring. The wheel hub has a wheel mounting flange formed at one end portion. A cylindrical portion axially extends from the wheel mounting flange. The inner ring is press fit onto the cylindrical portion of the wheel hub. The inner member has a plurality of inner raceway surfaces adapted to be arranged opposite to the plurality of outer raceway surfaces. Double row rolling elements are freely rollably contained, via cages, between the outer raceway surfaces and inner raceway surfaces, respectively, of the outer member and the inner member. Seals are arranged in annular spaces formed between the outer member and the inner member. The knuckle is integrally formed with a disc-shaped bottom. The outer member is adapted to be connected to the knuckle, via bolts, with the body mounting flange abutted against the knuckle. The inner side end of the inner member is covered by the knuckle. Thus, it is possible to eliminate the pilot portion of the outer member to be fit into the knuckle. Thus, this increases the rigidity and strength of the knuckle while reducing the weight and size of the wheel bearing apparatus.

The present disclosure provides a bearing apparatus for a driven wheel of a vehicle comprising an outer member integrally formed with a body mounting flange on its outer circumference. The body mounting flange is adapted to be mounted on a knuckle, forming part of a suspension apparatus of the vehicle. The outer member on its inner circumference includes double row outer raceway surfaces. An inner member includes a wheel hub and at least one inner ring. The wheel hub has a wheel mounting flange formed at one end portion. A cylindrical portion axially extends from the wheel mounting flange. The inner ring is press fit onto the cylindrical portion of the wheel hub. The inner member has a plurality of inner raceway surfaces adapted to be arranged opposite to the plurality of outer raceway surfaces. Double row rolling elements are freely rollably contained, via cages, between the outer raceway surfaces and inner raceway surfaces, respectively, of the outer member and the inner member. Seals are arranged in annular spaces formed between the outer member and the inner member. The inner ring is axially secured by a caulked portion. The caulked portion is formed by radially outwardly plastically deforming the end of the cylindrical portion. The knuckle is integrally formed with a disc-shaped bottom. The outer member is adapted to be connected to the knuckle, via bolts, with the body mounting flange abutted against the knuckle. The inner side end of the inner member is covered by the knuckle. A draining aperture is formed at a bottom region facing toward the ground in a connected portion between the outer member and the knuckle. A closed space formed by the outer member and the knuckle communicates with the external circumstance.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the vehicle wheel bearing apparatus for a driven wheel.

FIG. 2(a) is a partial enlarged view of FIG. 1.

FIG. 2(b) is a partial enlarged view of a modification of FIG. 2(a).

FIG. 2(c) is a partial enlarged view seen from an arrow "A" in FIG. 2(b).

FIG. 3 is a longitudinal section view of a second embodiment of the vehicle wheel bearing apparatus for a driven wheel.

FIG. 4 is a longitudinal section view of a prior art vehicle wheel bearing apparatus for a driven wheel.

DETAILED DESCRIPTION

Preferred embodiments of the present disclosure will be described with reference to the accompanying drawings.

FIG. 1 is a longitudinal section view of a first embodiment of the vehicle wheel bearing apparatus for a driven wheel. FIG. 2(a) is a partially enlarged view of FIG. 1. FIG. 2(b) is a partially enlarged view of a modification of FIG. 2(a). FIG. 2(c) is an partially enlarged view seen from an arrow "A" in FIG. 2(b). In the description below, the term "outer side" (left-hand side in drawings) of the apparatus denotes a side that is positioned outside of the vehicle body. The term "inner side" (right-hand side in drawings) of the apparatus denotes a side that is positioned inside of the body when the bearing apparatus is mounted on the vehicle body.

The vehicle wheel bearing apparatus is a so called third generation type used for a driven wheel. It includes an inner member 1, an outer member 10, and double row rolling elements (balls) 6, 6, rollably contained between the inner and outer members 1, 10. The inner member 1 includes a wheel hub 2 and a separate inner ring 3. The inner ring 3 is press-fit onto the wheel hub 2, via a predetermined interference.

The wheel hub 2 has an integrally formed wheel mounting flange 4 to mount a wheel (not shown) at the outer side end. Hub bolts 5, to secure the wheel on the flange 4, are equidistantly arranged along the periphery of the flange 4. The wheel hub 2 is formed with an inner raceway surface 2a on its outer circumference. A cylindrical portion 2b axially extends from the inner raceway surface 2a. The inner ring 3 is formed with the other (i.e. inner side) inner raceway surface 3a on its outer circumference. The inner ring 3 is press-fit onto the cylindrical portion 2b of the wheel hub 2. The inner ring 3 is axially immovable secured by a caulked portion 2c to prevent it from slipping off from the wheel hub 2. The caulked portion 2c is formed by plastically deforming the end portion of the cylindrical portion 2b.

The wheel hub 2 is made of medium carbon steel (carbon steels for machine structural use of JIS SC family) including carbon of 0.40~0.80% by weight such as S53C. It is formed with a hardened layer having a surface hardness of 58~64 HRC. High frequency induction hardening forms the hardened layer over a region including the outer side inner raceway surface 2a, a seal land portion and the axially extending portion 2b. A sealing means 8 can slide on the seal land portion. The caulked portion 2c remains as a non-quenched portion with a surface hardness less than 25 HRC after forging. The inner ring 3 is made of high carbon chrome bearing steel such as SUJ2. A high frequency induction hardening pattern increases the strength of the wheel hub 2 and suppresses fretting wear at the fitting surface of the inner ring 3. Thus, this improves the durability of the bearing apparatus. In addition, it is possible to improve the machining workability of the caulking portion 2c and to prevent the generation of cracks by its plastic deformation.

The outer member 10 is integrally formed with a body mounting flange 10b on its outer circumference. The body mounting flange 10b mounts the outer member 10 on a body of the vehicle (not shown). The outer member inner circumference includes double row outer raceway surfaces 10a and 10a. Similarly to the wheel hub 2, the outer member 10 is made of medium carbon steel including carbon of 0.40~0.80% by weight such as S53C. The double row outer raceway surfaces 10a, 10a are hardened by high frequency induction to have a surface hardness of 58~64 HRC. Double row rolling elements 6 and 6 are freely rollably contained between the outer and inner raceway surfaces 10a, 10a and 2a, 3a, by cages 7 and 7. Sealing members 8 and 9 are arranged in annular openings formed between the outer member 10 and the inner member 1. The seals 8, 9 prevent leakage of grease contained within the bearing as well as the penetration of rain water or dusts from the outside.

Although shown in the drawings as a so-called third generation type, with the inner raceway surface 2a directly formed on the outer circumference of the wheel hub, it will be appreciated that the bearing apparatus is not limited to such a third generation type and is applicable to a second generation type with a pair of inner rings press-fit onto the cylindrical portion of the wheel hub. Also, although it is shown with double row angular ball bearing having balls 6, 6 as the rolling elements, a double row conical rolling bearing having conical rollers as the rolling elements may be used.

In the present embodiment, the knuckle 11 is integrally formed with a disc-shaped bottom 11a. The inner side end of the inner member 1 is closed. In addition, no pilot portion, adapted to be fit into the knuckle 11, is formed on the outer circumference of the outer member 10. Thus, the outer member 10 is connected to the knuckle 11 by bolts (not shown) with the body mounting flange 10b of the outer member 10 abutted against the knuckle 11. This increases the rigidity and strength of the knuckle and reduces the weight and size of the wheel bearing apparatus.

Although the inner side ends of the inner member 1 and the outer member 10 are covered by the bottom 11a of the knuckle 11, it is possible that foreign matter such as rain water or dusts would penetrate into a closed space 13 defined between the body mounting flange 10b of the outer member 10 and the knuckle 11. If foreign matter penetrates into the closed space 13 and remained in it, the foreign matter would cause rusts on the caulked portion 2c etc. Further, it would penetrate into the bearing apparatus. According to the present disclosure, a draining aperture 12 is formed at a bottom region in the outer member 10. The draining aperture 12 faces toward the ground so as to communicate the closed space 13 with the external circumstance or environment. This makes it possible to prevent the penetration of foreign matter into the closed space 13 through the draining aperture 12. Also this makes it possible to easily discharge the foreign matter through the draining aperture 12. Thus, this prevents the foreign matter from penetrating into the inside of the bearing apparatus even if the foreign matter is to penetrate into the closed space 13 through the connected portion between the body mounting flange 10b of the outer member 10 and the knuckle 11.

As shown in an enlarged view of FIG. 2(a), the draining aperture 12 is formed in the inner side end of the outer member 10 near the seal 9. Foreign matter, such as rain water or dusts that penetrates into the closed space 13 from the outside environment tends to flow towards the bottom of the closed space 13 near the seal. However, the foreign matter will be quickly discharged to the outside through the draining aperture 12. The foreign matter does not remain near the seal 9 and thus the sealability of the seal 9 will not be affected.

FIG. 2(b) shows a draining groove 14 that is a modification of the draining aperture 12 of FIG. 2(a). The draining groove is arranged at an end face of the outer member 10' near the seal 9. The draining groove 14 has a substantially semicircular cross-section as shown in FIG. 2(c). Thus, it forms a draining aperture when the end face of the outer member 10' is contacted against the end face of the knuckle 11. It is appreciated that such a draining groove may be formed on the end face of the knuckle 11 so that a draining groove will be formed by contacting the end face of the knuckle 11 against the outer member 10'.

FIG. 3 is a longitudinal section view of a second embodiment of the vehicle wheel bearing apparatus for a driven wheel. The second embodiment is substantially the same as the first embodiment except for a partial difference in the structure of the knuckle. Thus, the same reference numerals are used to designate the same parts, portions and functions as those used in the first embodiment. Accordingly, the detailed description of them will be omitted.

Similarly to the knuckle 11 of the first embodiment, a knuckle 15 of the second embodiment has a bottom 11a to cover or close the inner side end of the inner member 1. On the contrary, the knuckle 15 is formed with a spigot portion 15a. The spigot portion 15a is adapted to be fit into an inner circumference of the inner side end of the outer member 10. This makes it possible to easily position the outer member 10 in a radial direction relative to the knuckle 15. Thus, this improves the workability during assembly.

Also in the second embodiment, the draining aperture 12 is formed at a bottom region in the outer member 10. The draining aperture 12 faces toward the ground to communicate the closed space 13 with the external circumstance or environment. Similarly to the first embodiment, the body mounting flange 10b abuts against the knuckle 15. The two are connected together by bolts (not shown). This increases the rigidity and strength of the knuckle 15 and reduces the weight and size of the wheel bearing apparatus.

The vehicle wheel bearing apparatus for a driven wheel can be applied to wheel bearing apparatus of the inner ring rotation type of second and third generation structures. A pilot portion adapted to be fit into the knuckle is not formed on the outer circumference of the outer member and thus the outer member is connected to the knuckle by bolts.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or the equivalents thereof.

What is claimed is:

1. A vehicle wheel bearing apparatus for a driven wheel comprising:

an outer member integrally formed with a body mounting flange on its outer circumference, said body mounting flange is adapted to be mounted on a knuckle forming part of a suspension apparatus of the vehicle, and said outer member inner circumference includes double row outer raceway surfaces;

an inner member includes a wheel hub and at least one inner ring, the wheel hub has a wheel mounting flange formed at one end portion and a cylindrical portion axially extending from the wheel mounting flange, the inner ring is press fit onto the cylindrical portion of the wheel hub, the inner member has a plurality of inner raceway surfaces adapted to be arranged opposite to the plurality of outer raceway surfaces;

double row rolling elements are freely rollably contained, via cages, between the outer raceway surfaces and inner raceway surfaces, respectively, of the outer member and the inner member; and seals are arranged in annular spaces formed between the outer member and the inner member;

said knuckle is integrally formed with a disc-shaped bottom;

said outer member is adapted to be connected to the knuckle, via bolts, the body mounting flange has a flat surface on its inner side from the periphery of the flange to a seal fitting surface, said body mounting flange flat surface being abutted against the knuckle; and an inner side end of the inner member is covered by the knuckle.

2. The vehicle wheel bearing apparatus for a driven wheel of claim 1, further comprising a draining aperture formed at a bottom region of the wheel bearing apparatus facing toward the ground for communicating, a closed space formed by the outer member and the knuckle with external circumstance or environment.

3. The vehicle wheel bearing apparatus for a driven wheel of claim 2, wherein the draining aperture is formed at the bottom region in the outer member of the inner side end of the outer member.

4. The vehicle wheel bearing apparatus for a driven wheel of claim 2, wherein the draining aperture is formed by a radially extending groove formed on one of the outer member and the knuckle and by an abutting surface of the other member of the outer member and the knuckle.

5. The vehicle wheel bearing apparatus for a driven wheel of claim 1, wherein the knuckle is formed with a spigot portion adapted to be fit into an inner circumference of the inner side end of the outer member for positioning the knuckle relative to the outer member.

6. The vehicle wheel bearing apparatus for a driven wheel of claim 1, wherein the outer member flange is devoid of a projecting pilot.

* * * * *